United States Patent [19]

Egawa

[11] Patent Number: 5,359,481
[45] Date of Patent: Oct. 25, 1994

[54] COMPOSITE TYPE FLOATING MAGNETIC HEAD

[75] Inventor: Motoji Egawa, Shizuoka, Japan

[73] Assignee: Minebea Co., Ltd., Nagano, Japan

[21] Appl. No.: 51,547

[22] Filed: Apr. 26, 1993

[30] Foreign Application Priority Data

Oct. 30, 1992 [JP] Japan .................................. 4-316274

[51] Int. Cl.$^5$ .............................................. G11B 5/60
[52] U.S. Cl. .................................................. 360/103
[58] Field of Search ................................... 360/103, 123

[56] References Cited

U.S. PATENT DOCUMENTS

| | | | |
|---|---|---|---|
| 3,229,268 | 1/1966 | Solyst | 360/103 |
| 4,393,428 | 7/1983 | Fujimara | 360/125 |
| 4,488,195 | 12/1984 | Yanagiuchi et al. | 360/125 |
| 4,682,254 | 7/1987 | Hashimoto et al. | 360/125 |
| 4,711,018 | 12/1987 | Matsuzawa | 360/125 |
| 4,745,507 | 5/1988 | Otomo et al. | 360/123 |
| 4,870,520 | 9/1989 | Shaw | 360/103 |
| 4,870,521 | 9/1989 | Okabayashi | 360/103 |
| 5,021,910 | 6/1991 | Murakami | 360/123 |

FOREIGN PATENT DOCUMENTS

| | | | |
|---|---|---|---|
| 209617 | 9/1991 | Japan | 360/103 |
| 028010 | 1/1992 | Japan | 360/103 |
| 222916 | 8/1992 | Japan | 360/103 |

Primary Examiner—A. J. Heinz
Assistant Examiner—George J. Letscher
Attorney, Agent, or Firm—Oliff & Berridge

[57] ABSTRACT

A floating magnetic head, which suppresses the effects of an external magnetic head and has rails of good flatness. The winding of the head can be wound at high efficiency. The number of turns $n_1$ of the coil on the side of the leading end is set less than the number of turns $n_2$ of the coil on the side of the trailing end. The product of the number of turns $n_1$ of the coil on the side of the leading end and the cross-sectional area $A_1$ of the core leg on the side of the trailing end is set substantially equal to the product of the number of turns $n_2$ of the coil on the side of the tailing end and the cross-sectional area $A_2$ of the core leg on the side of the trailing end. That is, $n_1 \cdot A_1 = n_2 \cdot A_2$. The magnitude of the noise voltage induced across the coil on the side of the leading end is substantially equal to the magnitude of the noise voltage induced across the coil on the side of the trailing end. Furthermore, the two coils are wound in opposite senses. Therefore, noise voltage produced in the whole floating magnetic head is null. In this manner, the generation of noise due to an external magnetic field is prevented. Since the number of turns $n_1$ of the coil on the side of the leading end is smaller, the whole groove is not required to be made deep. Hence, the amount of the overhang of one rail can be reduced, whereby the flatness can be improved. Furthermore, the interference with the bottom of the groove can be avoided. This improves the efficiency of the operation to wind the coils.

3 Claims, 3 Drawing Sheets

COMPOSITE TYPE FLOATING MAGNETIC HEAD

FIELD OF THE INVENTION

The present invention relates to a floating magnetic head used in a magnetic disk drive and, more particularly, to a floating magnetic head of the composite type.

BACKGROUND OF THE INVENTION

A floating magnetic head of the composite type which has been heretofore frequently used is generally indicated by reference numeral 1 in FIG. 5. This head 1 has a substantially rectangular slider 2 made of a ceramic such as calcium titanate. Rails 3 and 4 for producing a floating force are mounted on the top surface of the slider 2 which is opposite to a magnetic recording medium. One rail 3 has a slit 6 of a given depth, the slit 6 extending longitudinally of the rail 3 on the side of its trailing end 5 at which the medium exits from the head. A head core 8 having a read/write gap 7 and made of a ferromagnetic substance such as a ferrite is inserted in the slit 6. The core 8 is rigidly mounted by sealing of glass or other bonding material.

A groove 10 which increases gradually in depth from its leading end 9 toward its trailing end 5 is formed at one corner of the slider 2. The groove 10 extends to the trailing end 5. The head core 8 has a leg 8a mounted in the groove 10 on the side of the trailing end 5. A coil 11 is wound around the leg 8a of the core.

In this floating magnetic head 1, the coil 11 is wound only on the core leg 8a disposed on the side of the trailing end 5. Therefore, if an external magnetic field which is perpendicular to the floating surfaces of the rails 3 and 4 acts on the floating surfaces, an electromotive force may be induced in the coil 11, whereby noise is produced.

It is sometimes necessary that the coil 11 is composed of a number of turns. In this case, the coil 11 is required to form multiplex winding because the width of the groove 10 is limited. However, where the coil 11 is built in multiplex winding, the outer portion of the coil 11 is inferior in sensitivity to the inner portion. Also, there is the possibility that the outer portion of the coil 11 is disarranged toward the rail 3 and makes contact with the magnetic recording medium, thus creating a breakage.

The present applicant in U.S. patent application Ser. No. 08/059,297 has already proposed an improved floating magnetic head to alleviate the foregoing problems. This head is generally indicated by numeral 1 in FIG. 6. It is to be noted that like components are indicated by like reference numerals in various figures. In FIG. 6, the head 1 has a head core 21 provided with a read/write gap 20. The core 21 has two legs 21a and 21b which are located on the side of the entrance end 9 and on the side of the trailing end 5, respectively, of the groove 10. Coils 22 and 23 having the same number of turns are wound around the legs 21a and 21b, respectively, of the core.

In this floating magnetic head 1 shown in FIG. 6, when it undergoes an external magnetic field, the coil 22 wound on the core leg 21a on the side of the leading end 9 and the coil 23 wound on the core leg 21b on the side of the trailing end 5 cancel out the induced electromotive force. Thus, generation of noise is suppressed. Also, it follows that one coil is divided into the two equal coils 22 and 23 wound around the legs 21a and 21b, respectively. The number of turns of each of the coils 22 and 23 is reduced accordingly. This reduces the amount of lap winding to thereby prevent deterioration of the sensitivity. Hence, breakage of the coils due to disarrangement of the coils is prevented.

In the floating magnetic head 1 shown in FIG. 6, the groove 10 is formed obliquely such that its depth gradually increases from the leading end 9 toward the trailing end 5. The clearance $L_1$ (see FIG. 2; the core leg 30a on the side of the entrance end shown in FIG. 2 corresponds to the core leg 21a on the side of the leading end 9) between the core leg 21a on the side of the leading end 9 and the bottom 24 of the groove is different from the clearance $L_2$ (see FIG. 2; the core leg 30b on the side of the exit end shown in FIG. 2 corresponds to the core leg 21b on the side of the entrance end 9) between the core leg 21b on the side of the trailing end 5 and the bottom 24 of the groove. Consequently, the amount of the coil 22 wound around the core leg 21a on the side of the leading end 9 differs from the amount of the coil 23 wound around the core leg 21b on the side of the trailing end 5.

As shown in FIG. 6, in order to wind the equal amounts of the coils 22 and 23 on the core legs 21a and 21b, the groove 10 is made deeper more than needed. This may increase the amount of overhang of the rail 3 located over the groove 10, thus deteriorating the flatness of the rail 3. Where the coil 22 is wound around the core leg 21a on the side of the leading end 9, the winding operation is more difficult to perform than on the side of the trailing end 5 due to the interference with the bottom 24 of the groove. Also, a larger amount of work is needed.

SUMMARY OF THE INVENTION

It is an object of the present invention to provide a floating magnetic head which suppresses the effects of an external magnetic field, has rails having good flatness, and has coils capable of being wound at improved efficiency.

This object is achieved in accordance with the teachings of the invention by a floating magnetic head comprising: a substantially rectangular slider made of a nonmagnetic material and provided with a groove which gradually increases in depth from its entrance end toward its trailing end, the groove extending to the trailing end; rails mounted on the surface of the slider which is opposite to a magnetic recording medium to produce a floating force; a head core having legs located in the groove on the side of the entrance end of the groove and on the side of the trailing end of the groove, respectively, the core having a read/write gap; two coils wound in opposite senses around the legs, respectively, of the head core, the coils facing the groove, the coils being located on the side of the leading end and on the side of the trailing end, respectively.

The number of turns of the coil on the side of the leading end is less than the number of turns of the coil on the side of the exit end. The cross-sectional area of the leg of the core on the side of the leading end is larger than the cross-sectional area of the leg of the core on the side of the exit end. The product of the number of turns of the coil on the side of the leading end and the cross-sectional area of the core leg on the side of the leading end is set substantially equal to the product of the number of turns of the coil on the side of the trailing end and the cross-sectional area of the core leg on the side of the trailing end.

In this structure, the product of the number of turns of the coil on the side of the leading end and the cross-sectional area of the core leg on the side of the leading end is set substantially equal to the product of the number of turns of the coil on the side of the trailing end and the cross-sectional area of the core leg on the side of the trailing end and, therefore, the magnitude of the noise voltage induced across the coil on the side of the leading end is substantially equal to the magnitude of the noise voltage induced across the coil on the side of the exit end. Furthermore, the coil on the side of the leading end and the coil on the side of the trailing end are wound in opposite senses. Therefore, the noise voltages induced across the two coils cancel out each other. The noise voltage produced in the whole floating magnetic head is null.

Since the number of turns of the coil on the side of the leading end is less than the number of turns of the coil on the side of the trailing end, the clearance between the core on the side of the leading end and the bottom of the groove is balanced against the clearance between the core on the side of the trailing end and the bottom of the groove. This makes it unnecessary to render the whole groove deep. Also, because the number of turns of the coil wound around the core leg on the side of the leading end is less than the number of turns of the coil wound around the core leg on the side of the trailing end the groove can be made shallow.

Other objects and features of the invention will appear in the course of the description thereof which follows.

DETAILED DESCRIPTION OF THE INVENTION

Figure 1:
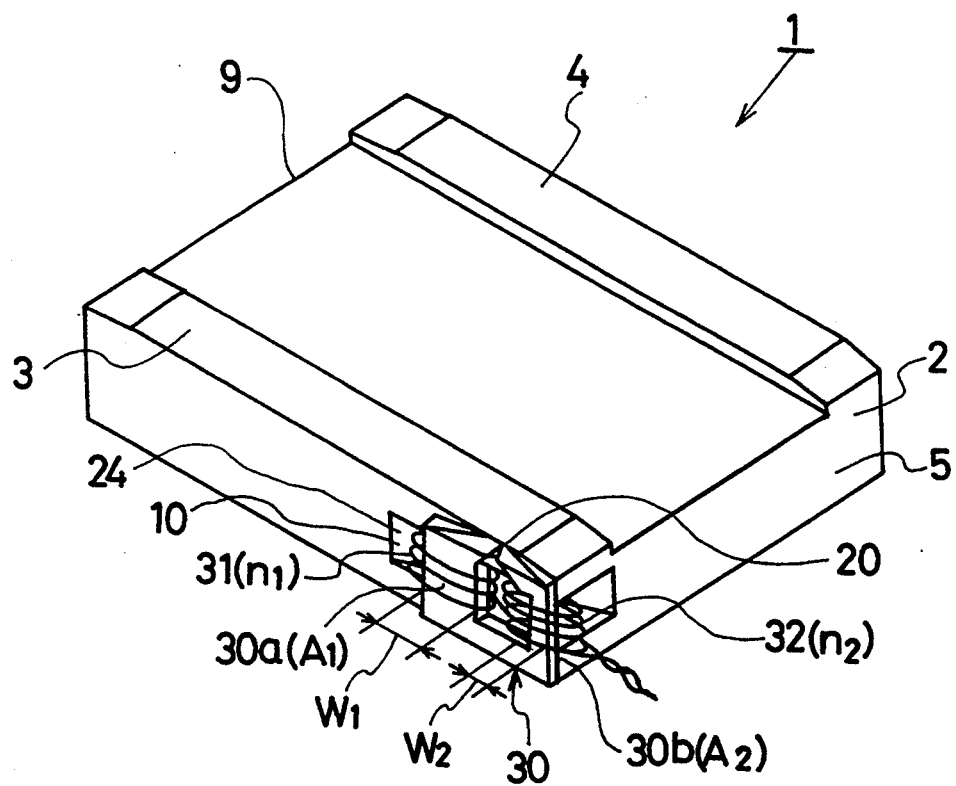
FIG. 1 is a perspective view of a floating magnetic head according to the invention.

Referring to FIG. 1, a floating magnetic head according to the invention is generally indicated by reference numeral 1. The head 1 comprises a substantially rectangular slider 2 made of a ceramic such as calcium titanate. Rails 3 and 4 are mounted on the top surface of the slider 2 which is opposite to a magnetic recording medium (not shown) to produce a floating force.

The slider 2 has a groove 10 at the corner located on the side of the exit end 5 from which the magnetic recording medium exits. The depth of the groove 10 gradually increases from the leading end 9 toward the trailing end 5, and the groove 10 extends to the trailing end 5. A head core 30 is bonded to this corner and faces the groove 10.

The head core 30 has two core legs $30a$ and $30b$ of the same thickness. These legs $30a$ and $30b$ are located on the side of the leading end 9 and on the side of the trailing end 5, respectively, of the groove 10. Coils 31 and 32 are wound around these legs $30a$ and $30b$, respectively. The width $W_1$ of the core leg $30a$ on the side of the leading end is set larger than the width $W_2$ of the core leg $30b$ on the side of the trailing end. The cross-sectional area $A_1$ of the core $30a$ is larger than the cross-sectional area $A_2$ of the core $30b$.

The coils 31 and 32 on the side of the leading end and on the side of the trailing end, respectively, are wound in opposite senses and connected together. The number of turns $n_1$ of the coil 31 on the side of the leading end is less than the number of turns $n_2$ of the coil 32 on the side of the trailing end. The product of the number of turns $n_1$ of the coil 31 and the cross-sectional area $A_1$ of the core leg $30a$ is set substantially equal to the product of the number of turns $n_2$ of the coil 32 and the cross-sectional area $A_2$ of the core leg $30b$.

Figure 2:
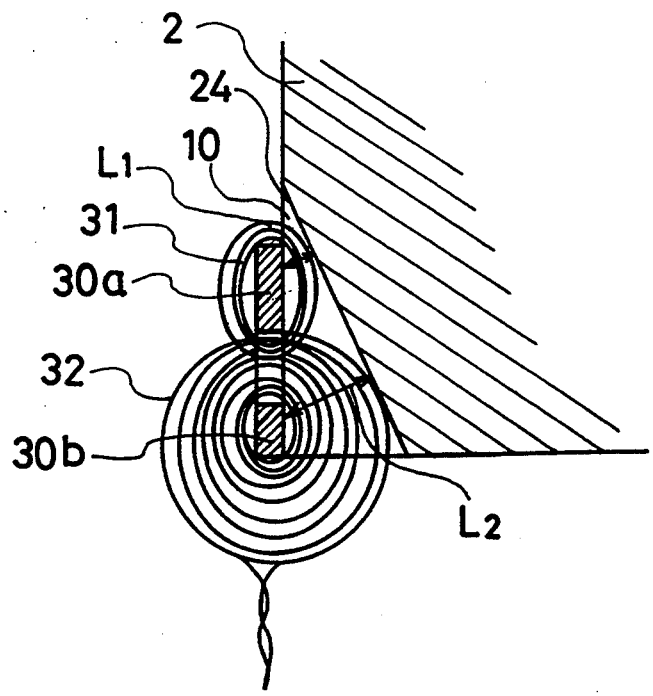
FIG. 2 is a schematic cross section of the floating magnetic head shown in FIG. 1.

Referring also to FIG. 2, since the number of turns $n_1$ of the coil 31 on the side of the leading end is less than the number of turns $n_2$ of the coil 32 on the side of the exit end, the clearance $L_1$ between the core leg $30a$ on the side of the leading end and the bottom 24 of the groove is balanced against the clearance $L_2$ between the core leg $30b$ on the side of the trailing end and the bottom 24 of the groove. This makes it unnecessary to render the whole groove 10 deep. Hence, the amount of the overhang of the rail 3 can be reduced, whereby the flatness can be improved. Furthermore, the interference with the bottom 24 of the groove can be avoided because the number of turns $n_1$ of the coil 31 on the side of the leading end is smaller as mentioned above. This improves the efficiency of the operation to wind the coils. In consequence, the cost of the finished floating magnetic head can be reduced.

The effect of an external magnetic field is described next. If an external magnetic field acts on the surfaces of the rails 3 and 4 perpendicularly to these surfaces, the magnetic flux of the external magnetic flux is divided into two portions, which pass through the legs $30a$ and $30b$, respectively, of the core.

The portion excluding the core legs $30a$ and $30b$, i.e., the portion opposite to the magnetic recording medium, has a short magnetic path length. Therefore, assuming that the magnetic resistance of this portion is sufficiently smaller than the magnetic resistances of the core legs $30a$ and $30b$, the magnetic fluxes flowing through the cores $30a$ and $30b$, respectively, are given by $$\Phi_1 = H(t)/(l_1/\mu \cdot A_1) \qquad (1)$$

$$\Phi_2 = H(t)/(l_2/\mu \cdot A_2) \qquad (2)$$

where $l_1$ is the magnetic path length of the core leg $30a$ on the side of the leading end, $\mu$ is the magnetic permeability of the head core 30, and $l_2$ is the magnetic path length of the core leg $30b$ on the side of the trailing end. The noise voltages induced across the coils 31 and 32 are respectively given by $$V_1(t) = -n_1 \cdot d\Phi_1/dt = -n_1 \cdot (\mu A_1/l_1) \cdot dH(t)/dt \qquad (3)$$

$$V_2(t) = -n_2 \cdot d\Phi_2/dt = -n_2 \cdot (\mu A_2/l_2) \cdot dH(t)/dt \qquad (4)$$

Assuming that $l_1 = l_2$ and $n_1 \cdot A_1 = n_2 \cdot A_2$, we have $$V_1(t) = V_2(t) \qquad (5)$$

In this way, the noise voltages $V_1(t)$ and $V_2(t)$ are equal. Since the coils 31 and 32 are wound in opposite senses with respect to the external magnetic field, the noise voltages $V_1(t)$ and $V_2(t)$ cancel out each other. Therefore, the noise voltage produced in the whole floating magnetic head 1 is null. In this manner, the generation of noise due to an external magnetic field is prevented.

In the above example, the core legs 30a and 30b have the same thickness. The width $W_1$ of the leg 30a is larger than the width $W_2$ of the leg 30b. The cross-sectional area $A_1$ of the leg 30a is larger than the cross-sectional area $A_2$ of the leg 30b. The cross-sectional area $A_1$ of the leg 30a can be made larger than the cross-sectional area $A_2$ of the leg 30b by making their thicknesses different while setting their widths equal to each other, by making their widths and thicknesses different, or by making their widths and thicknesses different.

Figure 3:
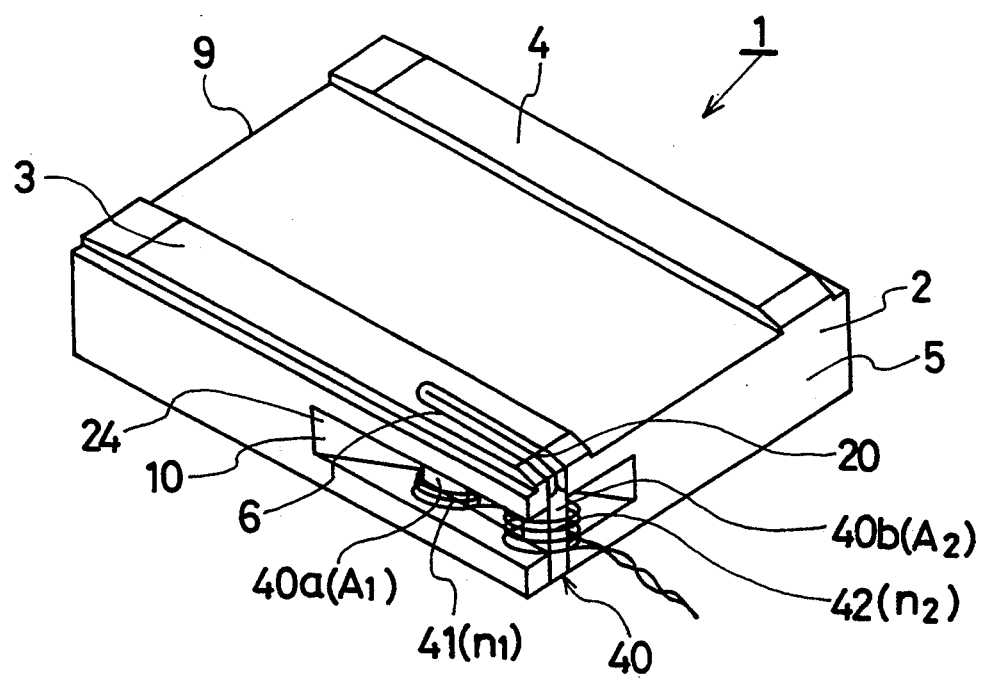
FIG. 3 is a perspective view of another floating magnetic head according to the invention.
Figure 4:
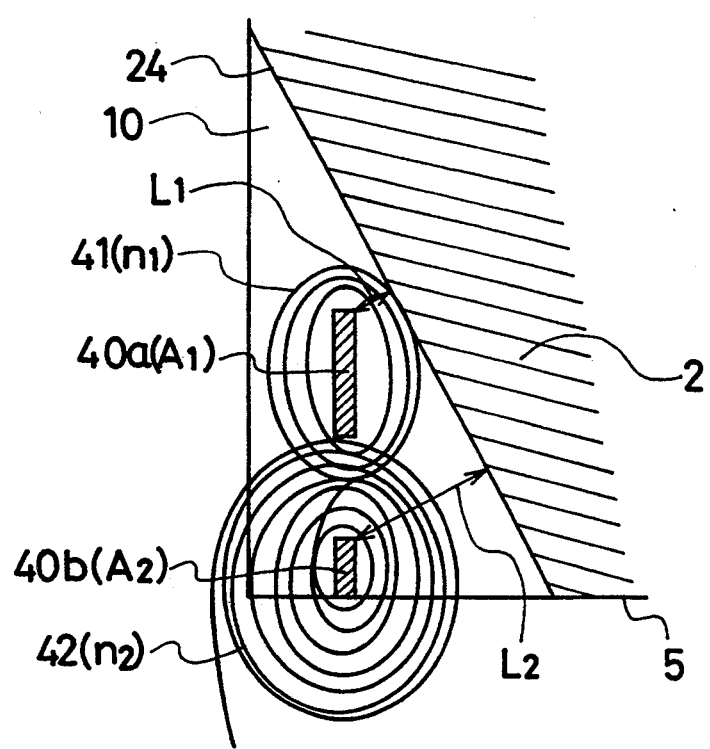
FIG. 4 is a schematic cross section of the floating magnetic head shown in FIG. 3.
Figure 5:
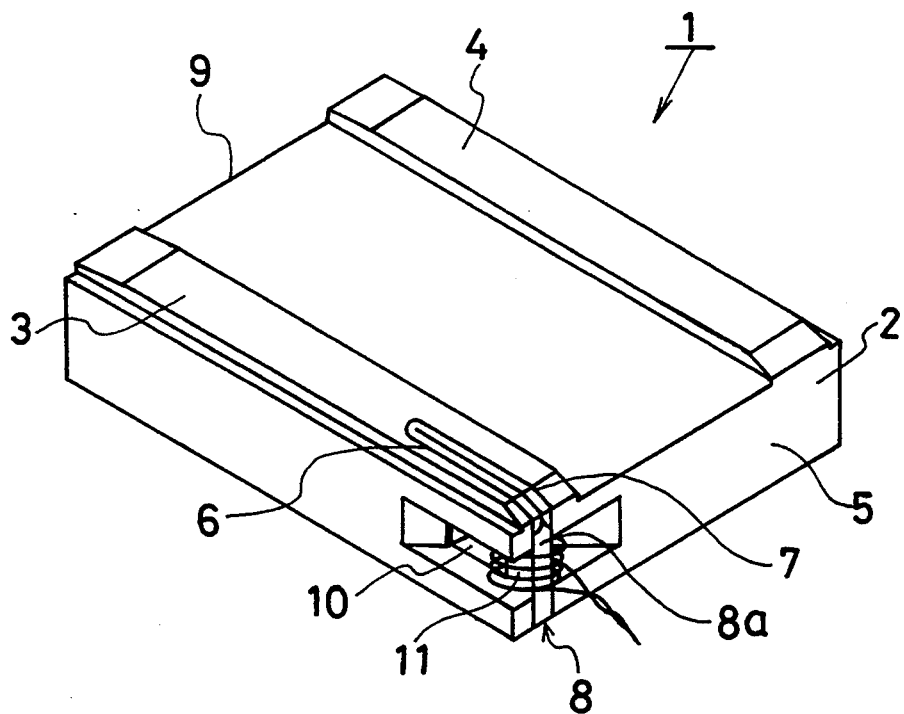
FIG. 5 is a perspective view of related art conventional floating magnetic head.
Figure 6:
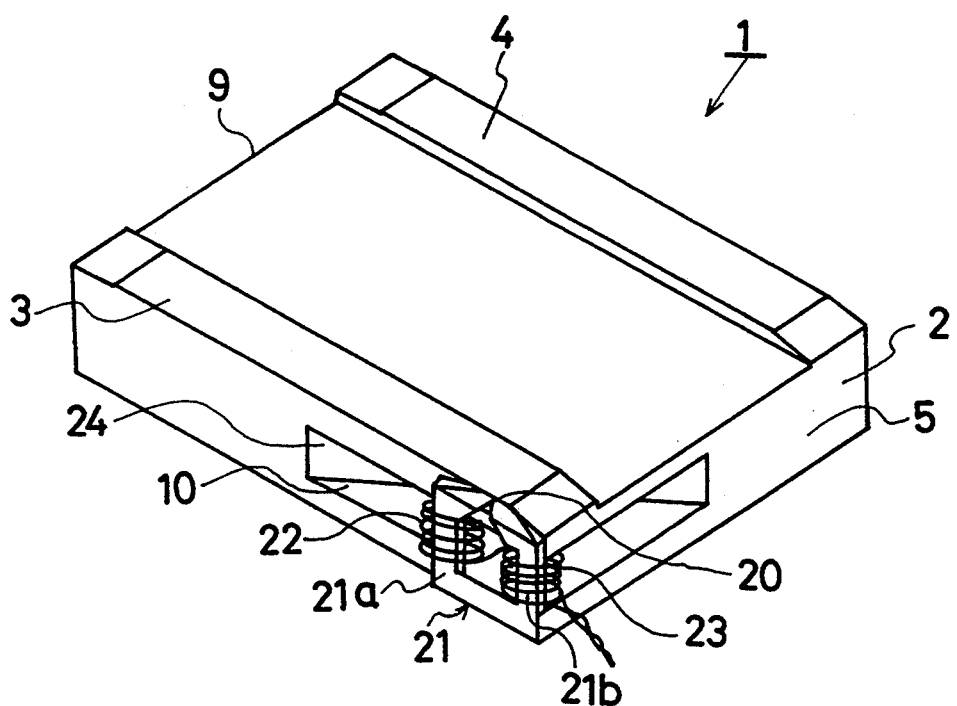
FIG. 6 is a perspective view of another related art floating magnetic head.

Another floating magnetic head according to the invention is next described by referring to FIGS. 3 and 4. The head, indicated by numeral 1, comprises a substantially rectangular slider 2 made of a ceramic such as calcium titanate. Rails 3 and 4 are mounted on the top surface of the slider 2 which is opposite to a magnetic recording medium (not shown) to produce a floating force. One rail 3 is provided with a slit 6 of a given depth, the slit 6 extending parallel to this rail 3. The slit 6 is located on the side of the trailing end 5 from which the medium exits. A head core 40 having a read/write gap 20 and made of a ferromagnetic material such as a ferrite is inserted in the slit 6 and sealed by glass or other bonding material.

The head core 40 has two core legs 40a and 40b of the same thickness. These legs 40a and 40b are located on the side of the leading end 9 of the groove 10 and on the side of the trailing end 5, respectively, of the groove 10. Coils 41 and 42 are wound around these legs 40a and 40b, respectively. The width of the core leg 40a on the side of the entrance end is set larger than the width of the core leg 40b on the side of the exit end. The cross-sectional area $A_1$ of the leg 40a is larger than the cross-sectional area $A_2$ of the leg 40b.

The coils 41 and 42 on the side of the entrance end and on the side of the trailing end, respectively, are wound in opposite senses with respect to an external magnetic field and connected together. The number of turns $n_1$ of the coil 41 on the side of the entrance end is less than the number of turns $n_2$ of the coil 42 on the trailing end. The product of the number of turns $n_1$ of the coil 41 and the cross-sectional area $A_1$ of the core leg 40a on the side of the leading end is set substantially equal to the product of the number of turns $n_2$ of the coil 42 on the side of the leading end and the cross-sectional area $A_2$ of the core leg 40b on the side of the leading end.

In this floating magnetic head 1, the number of turns $n_1$ of the coil 41 on the side of the leading end is less than the number of turns $n_2$ of the coil 42 on the side of the trailing end. The clearance $L_1$ between the core leg 40a on the side of the leading end and the bottom 24 of the groove is balanced against the clearance $L_2$ between the core leg 40b on the side of the exit end and the bottom 24 of the groove, in the same way as in the floating magnetic head 1 described previously in connection with FIG. 1. This makes it unnecessary to render the whole groove 10 deep. Hence, the amount of the overhang of the rail 3 can be reduced, whereby the flatness can be improved. Furthermore, the interference with the bottom 24 of the groove can be circumvented because the number of turns $n_1$ of the coil 41 on the side of the leading end is smaller as mentioned above. This improves the efficiency of the operation to wind the coils. In consequence, the cost of the finished floating magnetic head can be reduced.

Since the product of the number of turns $n_1$ of the coil 41 on the side of the leading end and the cross-sectional area $A_1$ of the core leg 40a on the side of the leading end is set substantially equal to the product of the number of turns $n_2$ of the coil 42 on the side of the leading end and the cross-sectional area $A_2$ of the core leg 40b on the side of the trailing end, the magnitude of the noise voltage induced across the coil 41 is equal to the magnitude of the noise voltage induced across the coil 42. Furthermore, the coils 41 and 42 are wound in opposite senses. Therefore, the noise voltages induced across the coils 41 and 42 cancel out each other. Therefore, the noise voltage produced in the whole floating magnetic head 1 is null. In this manner, the generation of noise due to an external magnetic field is prevented.

Because the novel floating magnetic head is constructed as described above, and because the product of the number of turns of the coil on the side of the entrance end and the cross-sectional area of the core leg on the side of the leading end is set substantially equal to the product of the number of turns of the coil on the side of the trailing end and the cross-sectional area of the core leg on the side of the trailing end, the magnitude of the noise voltage induced across the coil on the side of the leading end is substantially equal to the magnitude of the noise voltage induced across the coil on the side of the trailing end. Furthermore, the coil on the side of the leading and and the coil on the side of the trailing end are wound in opposite senses. Therefore, the noise voltages induced across the two coils cancel out each other. The noise voltage produced in the whole floating magnetic head is null. In this manner, the generation of noise due to an external magnetic field is prevented.

Since the number of turns of the coil on the side of the leading end is less than the number of turns of the coil on the side of the trailing end, the clearance between the core leg on the side of the leading end and the bottom of the groove is balanced against the clearance between the core leg on the side of the trailing end and the bottom of the groove. This makes it unnecessary to render the whole groove deep. Hence, the amount of the overhang of the rail can be reduced, whereby the flatness can be improved. Furthermore, the interference with the bottom of the groove can be avoided because the number of turns of the coil on the side of the entrance end is smaller as mentioned above. This improves the efficiency of the operation to wind the coils. In consequence, the cost of the finished floating magnetic head can be reduced.

What is claimed is:

1. A floating magnetic head comprising:
a substantially rectangular slider made of a nonmagnetic material and having leading and trailing ends, the slider being provided with a groove which gradually increases in depth along one side of the slider extending toward the trailing end and opening at the trailing end:
rails mounted on surface of the slider which is opposite to a magnetic recording medium to produce a floating force;
a head core located on the one side of the slider and having first and second legs, the second leg being located at the trailing end of the slider such that the first leg is located between the second leg and the leading end of the slider, the core having a read/write gap;

a coil wound around the first leg in one sense and another coil wound around the second leg in an opposite sense, the coils being at least partially in the groove;

the coils being at least partially in the groove;

a number of turns of the coil on the first leg being less than a number of turns of the coil on the second leg;

the cross-sectional area of the first leg of the core being larger than the cross-sectional area of the second leg; and a product of the number of turns of the first coil and the cross-sectional area of the first leg being set substantially equal to the product of the number of turns of the second coil and the cross-sectional area of the second leg.

2. The floating magnetic head according to claim 1, wherein the head core is located outside the groove on the one side of the slider.

3. The floating magnetic head according to claim 1, wherein the head core is located within the groove on the one side of the slider.

* * * * *